United States Patent Office 2,813,913
Patented Nov. 19, 1957

2,813,913
PRODUCTION OF NITROHYDROCARBONS

Harry Welz and Aloys Giltges, Krefeld, Germany, assignors to Farbenfabriken Bayer Aktiengesellschaft, Leverkusen, Germany, a corporation of Germany No Drawing. Application May 4, 1953,
Serial No. 353,015

Claims priority, application Germany May 6, 1952

4 Claims. (Cl. 260—644)

This invention relates to the production of saturated aliphatic and cycloaliphatic mononitro-hydrocarbons.

It is known that aliphatic or cycloaliphatic mononitro-hydrocarbons may be produced by reacting the corresponding hydrocarbons with nitric acid or nitrates in the liquid phase, preferably at elevated temperature and pressure. The nature and quantity of the by-products particularly of the oxidation by-products such as acids, aldehydes, ketones and alcohols depend largely on the method of nitration.

Nitration is carried out on an industrial scale by passing the hydrocarbons and the nitrating medium directly through a reaction chamber, that is to say, in the same direction. By means of filling bodies or stirrers a thorough mixing of the two components is ensured. This method of working however results in a relatively high proportion of oxidation products, especially acids. Apart from the decreased yield of mononitro-hydrocarbons resulting from the above arrangement, the repeated use of the nitrating medium is restricted by the increasing concentration of by-products occurring therein.

According to the present invention, aliphatic or cycloaliphatic hydrocarbons are produced by reacting the corresponding liquid saturated hydrocarbons with a liquid nitrating medium such as nitric acid or nitrates at elevated temperature and preferably at elevated pressure, the formation of by-products and more particularly the increased concentration thereof within the nitrating medium being suppressed by passing the hydrocarbons and the nitrating medium in counterflow through the reaction chamber.

The reaction chamber may for instance consists of a vertical duct made from acid resistant steel, said duct being charged with filling bodies. The reaction components are preferably raised to their reaction temperature prior to passing them into this reaction chamber. The nitrating medium is injected at the upper end, the hydrocarbon in contrast thereto being injected at the lower end of the reaction chamber, preferably at elevated pressure. The heat liberated by the reaction may for instance be conducted away in a known manner by cooling the walls of the reaction chamber with water or oil. The cooling may, however, be brought about for instance by circulating an excess of the hydrocarbon which is to be nitrated or by injecting a proportion of the cold hydrocarbon into the reaction chamber at various places. The reaction products and hydrocarbon which has not been converted in the reaction are sucked off at the upper end whilst the spent nitrating medium is sucked off at the lower end of the reaction chamber. Increased concentration of the soluble by-products in the nitrating medium is prevented to a large extent because the hydrocarbon which flows in the opposite direction in the reaction chamber serves to wash the nitrating medium.

Liquid saturated aliphatic and cycloaliphatic hydrocarbons which may advantageously be converted by the present method into mononitro-hydrocarbons i. e. such saturated hydrocarbons which are liquid under atmospheric or elevated pressure are for instance: the propanes, the butanes, the pentanes, the hexanes, the heptanes, the octanes, the dodecanes, cyclopentane, methylcyclopentane, cyclohexane, methylcyclohexane, cycloheptane, methylcycloheptane, decahydronaphthalene and mixtures of any hydrocarbons, e. g. such of the Fischer-Tropsch synthesis.

Nitrating mediums which may be used according to the invention are for instance: nitric acid with a concentration from about 15 to about 60 percent and especially from about 25 to about 40 percent, and hydrated nitrates of copper, zinc, aluminium, chromium and iron.

Suitable temperatures for the reaction are up to the dissociation point of the nitrating medium, e. g. from about 50 to about 300° C. and especially from about 130 to about 200° C.

It is advantageous to work under corresponding pressures i. e. pressures from 1 to about 200 and especially from 10 to about 50 atmospheres.

The following examples are given for the purpose of illustrating the invention:

Example 1

30 kg. of n-heptane and 23 kg. of hydrated aluminium nitrate are injected per hour at an excess pressure of 30 atmospheres after previous heating to 130° C. into a vertical pressure tube, charged with filling bodies, made from acid resistant steel (diameter 50 mm., length 2000 mm.). Injection of the nitrate takes place 20 cm. below the upper end. Injection of the heptane takes place 20 cm. above the lower end of the reaction tube. The temperature of the reaction chamber is kept at 165–170° C. by means of oil circulating around the tube. The mixture produced by the reaction, consisting of unused aluminium nitrate and basic aluminium nitrate is sucked off at the lower end of the reaction tube. From this mixture (18.7 kg. per hour) there are evaporated per hour about 1.5 kg. of water. After addition of 5.8 kg. of concentrated nitric acid (approximately 99% concentrated) it is possible to re-use the aluminium nitrate thereby recovered for further nitration.

The mixture of reaction products and n-heptane which has not been used in the reaction is removed by vaporization by reduction of pressure. There is thus evaporated 10 kg. of the n-heptane which after addition of 20 kg. of fresh n-heptane may be conducted back into the reaction chamber. In addition there are obtained 22.5 kg. of a liquid non-evaporated residue, which consists of n-heptane and reaction products. From this mixture are distilled off 13.5 kg. of n-heptane. The distillation residue (9 kg.) is fractionated by distillation in vacuum whereby the following yields are obtained:

| | Kg. |
|---|---|
| Nitroheptane | 7.2 |
| Heptylnitrite and heptanol | 1.2 |
| Dinitroheptane and acids | 0.6 |

In experiments carried out for the purpose of comparison, with identical quantities of n-heptane and the nitrating medium and under identical conditions, but injecting the reaction components in direct flow (i. e. by adding both components of the lower end in the reaction tube) the following yields were obtained:

540 g. of organic by-products dissolved in the spent nitrating medium
6.7 kg. of nitroheptane
1.45 kg. of heptylnitrite and heptanol
0.85 kg. of dinitroheptane and acids In continuous working the by-products dissolved in the nitrating medium increased to 14% by weight after tenfold re-use of the nitrating medium when using the direct flow process, said by-products reached only 1.5% by weight after tenfold re-use of the nitrating medium when using the counterflow process.

*Example 2*

30 kg. of cyclohexane and 23 kg. of hydrated aluminium nitrate are injected per hour in counterflow into the pressure tube in the same manner as described in Example 1. The temperature of the reaction chamber is kept at 155 to 160° C. by means of oil circulating around the tube. The mixture produced by the reaction, consisting of unused aluminium nitrate and basic aluminium nitrates is sucked off at lower end of the reaction tube. After being regenerated as described in Example 1 the aluminium nitrate may be re-used for further nitration.

The mixture of reaction product and cyclohexane which has not been used in the reaction is removed by vaporization by reduction of pressure. There is thus evaporated 11.5 kg. of the cyclohexane which after addition of 18.5 kg. of fresh cyclohexane may be conducted back into the reaction chamber. In addition there are obtained 20 kg. of a liquid non-evaporated residue, which consists of cyclohexane and further reaction products. From the mixture are distilled off 14 kg. of cyclohexane. The distillation residue (6 kg.) is fractionated by distillation in vacuum whereby the following yields are obtained:

|  | Kg. |
|---|---|
| Nitrocyclohexane | 4.6 |
| Cyclohexylnitrite and cyclohexanol | 0.9 |
| Dinitrocyclohexane and acids | 0.5 |

In experiments carried out for the purpose of comparison, with identical quantities of cyclohexane and the nitrating medium and under identical conditions, but injecting the reaction components in direct flow (i. e. by adding both components at the lower end in the reaction tube), the following yields were obtained:

500 g. of organic by-products dissolved in the spent nitrating medium
4.25 kg. of nitrocyclohexane
1.1 kg. of cyclohexylnitrite and cyclohexanol
0.65 kg. of dinitrocyclohexane and acids The advantage of the new method of working as compared with the old is most clearly observed in continuous working. Whereas the by-product dissolved in the nitrating medium increased to 11% by weight after tenfold re-use of the nitrating medium when using the direct flow process, said products reached only 1.4% by weight after tenfold re-use of the nitrating medium when using the counterflow process.

We claim:

1. In a process for the liquid phase nitration of a material selected from the group consisting of liquid saturated aliphatic and cycloaliphatic hydrocarbons to the corresponding mononitrohydrocarbons by means of a liquid nitrating medium selected from the group consisting of nitric acid having a concentration of from about 15 to about 60% and hydrated nitrates of copper, zinc, aluminum, chromium and iron at temperatures up to the dissociation point of the nitrating medium and within the range from about 50° C. to about 300° C. and at a pressure from 1 to about 200 atmospheres the step which comprises passing the hydrocarbon and the nitrating medium in countercurrent contact through a reaction zone, the hydrocarbon being introduced at one end of the reaction zone and the nitrating medium being introduced at the other end.

2. The process of claim 1 wherein the hydrocarbon and the nitrating medium are passed in counterflow through a vertical pressure tube, the nitrating medium being injected at the upper end and the hydrocarbon being injected at the lower end of the tube, and the reaction products are sucked off at the upper end and the spent nitrating medium is sucked off at the lower end of the tube.

3. A process for the manufacture of mono nitro n-hexane which comprises reacting n-hexane with hydrated aluminium nitrate at about 165–170° C. at a pressure of about 30 atmospheres, the n-hexane and the aluminium nitrate, prior raised to a temperature of about 130° being passed in counterflow through a vertical pressure tube of about 50 mm. diameter and 2000 mm. length, the aluminium nitrate being injected about 200 mm. below the upper end and the n-hexane being injected about 200 mm. above the lower end of the tube, the reaction products being sucked off at the upper end and the spent aluminium nitrate being sucked off at the lower end of the tube.

4. A process for the manufacture of mono nitro cyclohexane which comprises reacting cyclohexane with hydrated aluminium nitrate at about 155–160° C. at a pressure of about 30 atmospheres, the cyclohexane and the aluminium nitrate, prior raised to a temperature of about 130° C., being passed in counterflow through a vertical pressure tube of about 50 mm. diameter and 2000 mm. length, the aluminium nitrate being injected about 200 mm. below the upper end and the cyclohexane being injected about 200 mm. above the lower end of the tube, the reaction products being sucked off at the upper end and the spent aluminium nitrate being sucked off at the lower end of the tube.

References Cited in the file of this patent

UNITED STATES PATENTS

| 1,588,027 | Hopkins | June 8, 1926 |
| 2,153,065 | Martin | Apr. 4, 1939 |
| 2,332,491 | Senkus | Oct. 19, 1943 |
| 2,455,322 | Teeters et al. | Nov. 30, 1948 |

OTHER REFERENCES

Brown, G. G.: Unit Operations, 1950, pages 290–302.

Groggins: Unit Processes in Organic Synthesis, published by McGraw-Hill Book Co. Inc., New York city (1951), 4th edition, pages 7–18 relied on.